United States Patent
Kwon et al.

[11] Patent Number: 6,036,594
[45] Date of Patent: Mar. 14, 2000

[54] AIR HANDLING SYSTEM FOR AUTOMOTIVE VEHICLES

[75] Inventors: Yong Il Kwon, Plymouth; Dennis Anthony Vermette, Westland; Sean Patrick Cavanaugh, Farmington Hills; Hiroki Yanase, Dearborn, all of Mich.

[73] Assignee: Ford Motor Company, Dearborn, Mich.

[21] Appl. No.: 09/149,224

[22] Filed: Sep. 8, 1998

[51] Int. Cl.[7] .................................................. B60H 1/32
[52] U.S. Cl. .......................................... 454/156; 165/202
[58] Field of Search .................................. 454/121, 156; 165/204, 202

[56] References Cited

U.S. PATENT DOCUMENTS

| | | |
|---|---|---|
| 2,867,238 | 1/1959 | Wilfert . |
| 3,724,357 | 4/1973 | Kavthekar et al. . |
| 3,753,549 | 8/1973 | Rubright . |
| 3,854,525 | 12/1974 | Illg . |
| 4,125,150 | 11/1978 | Zelger et al. . |
| 4,408,714 | 10/1983 | Kobayashi . |
| 4,420,115 | 12/1983 | Matsushima et al. . |
| 4,469,305 | 9/1984 | Baumann . |
| 4,489,917 | 12/1984 | Baumann . |
| 4,681,153 | 7/1987 | Uchida . |
| 4,730,662 | 3/1988 | Kobayashi . |
| 4,842,047 | 6/1989 | Sakurada et al. . |
| 4,899,809 | 2/1990 | Takenaka et al. . |
| 4,907,497 | 3/1990 | Danieau . |
| 4,909,566 | 3/1990 | Hashimoto et al. . |
| 4,940,083 | 7/1990 | Takemaka et al. . |
| 5,050,486 | 9/1991 | Arold et al. . |
| 5,173,078 | 12/1992 | Robin et al. . |
| 5,176,201 | 1/1993 | Yamamoto . |
| 5,354,114 | 10/1994 | Kelman et al. . |
| 5,531,248 | 7/1996 | Pearson et al. . |
| 5,673,964 | 10/1997 | Roan et al. ........................ 454/121 X |
| 5,685,598 | 11/1997 | Inoue et al. . |
| 5,709,601 | 1/1998 | Heck . |
| 5,853,323 | 12/1998 | Beck et al. .............................. 454/156 |

FOREIGN PATENT DOCUMENTS

| | | |
|---|---|---|
| 2208377 | 9/1973 | Germany . |
| 2811482 | 9/1978 | Germany . |
| 2079694A | 1/1982 | United Kingdom . |

*Primary Examiner*—Harold Joyce
*Attorney, Agent, or Firm*—Raymond L. Coppiellie

[57] ABSTRACT

An air handling system for use in an air conditioning system of an automotive vehicle includes a housing which defines an air passage. The air handling system includes a blower disposed in the housing, an evaporator disposed in the housing for cooling air which passes through it. A heater core is also disposed in the housing downstream from the evaporator for heating the air as it is passed through it. The air handling system also includes a temperature blend door system having a first temperature blend door disposed in a bypass passage defined between the evaporator and the air outlets of the housing. The first temperature blend door is pivotable about a central axis from a closed position to an open position. A shoulder is formed in the housing for sealingly engaging a first end of the first blend door when the blend door is in a fully closed position and for controlling the amount of air flowing passed the first end as the first temperature blend door is pivoted toward a fully opened position. A second temperature blend door is disposed in the passage between the heater core and the evaporator. The first and second temperature blend doors move in an coordinated motion according to a predetermined strategy.

18 Claims, 3 Drawing Sheets

AIR HANDLING SYSTEM FOR AUTOMOTIVE VEHICLES

BACKGROUND OF THE INVENTION

1. Field of the Invention

The present invention relates generally to air handling systems within automotive vehicles. More particularly, the present invention relates to a center-mounted air handling system having a novel arrangement of temperature controlled blend doors having coordinated movements.

2. Disclosure Information

Many different types of air handling systems are well-known within the automotive vehicle art. The most commonly known air handling system typically includes a housing having a centrifugal blower which draws in fresh or recirculation air and discharges outlet air through the housing of the system. Disposed within the system are a pair of heat exchangers, one for the cooling the air leaving the centrifugal blower and the other for heating the air leaving the centrifugal blower. A blend door or system of blend doors are provided within the housing at key locations to control the amount of air flow through either or both of the heat exchangers to provide conditioned air into the interior passenger compartment of the vehicle. Typically, a vehicle occupant will adjust a temperature control knob within the interior of the vehicle to a desired setting which triggers the movement of the temperature control blend doors to predetermined positions. These positions are selected to provide a proper amount of cooled and heated air to meet the occupant's requested temperature selection.

Various technological improvements have been proposed to the known types of air handling systems, such as to provide dual temperature systems as well as dual temperature and mode systems. In these types of systems different temperatures can be provided to different areas within the interior compartment of the vehicle. Moreover, the conditioned air can be delivered from different outlets within the passenger compartment such as for heating the floor or defogging of the windshield. U.S. Pat. No. 5,673,964, assigned to the assignee of the present invention, discloses a unique air handling system which can be mounted generally along a center line of the vehicle to accommodate either a right hand drive or left hand drive vehicle. In order to accommodate this type of flexibility, the packaging of such an air handling system requires that the heat exchangers be in very close proximity to one another. Because of the small packaging characteristics of such a system, there is a very short duct length from the outlet of the air handling system to the interior passenger compartment of the vehicle. This short passageway may not provide enough volume for proper mixing of the air in the system to provide the appropriate temperature selected or requested by the vehicle occupant. For example, more air may be passed through an evaporator around a blend door than is necessary for a selected temperature. This would perhaps provide an incorrect temperature of conditioned air to discharge from the outlet registers of the air handling system. It would therefore be advantageous to provide an air handling system which allows for smaller packaging but overcomes the problems of the prior art in terms of the available volume for appropriate mixing of the warm and cool air.

It is an object of the present invention to provide a center-mounted air handling system with a temperature blend door system which provides proper mixing of the cool air and warm air prior to or to ensure the correct discharge temperature of air from the system registers.

It is a further object of the present invention to provide a blend door system having coordinated movement to provide correct discharged temperature air as requested by a vehicle occupant.

SUMMARY OF THE INVENTION

The present invention overcomes the disadvantages of the prior art by providing an air handling system for an air conditioning system of an automotive vehicle. The air handling system comprises a housing having a top side, a bottom side and a pair of walls disposed therebetween which define an air passage. The housing further includes an air inlet and a plurality of air outlets directed into a vehicle interior compartment, such as for floor heating, defogging, and vent modes. A blower is disposed in the housing which draws air into the housing and forces the air through the air passage of the housing. An evaporator is also disposed in the housing for cooling the air as it is passed therethrough as is a heater core disposed in the housing downstream from the evaporator. The heater core heats the air as it is passed therethrough. The handling system of the present invention further includes a first temperature blend door disposed in a first bypass passage extending in the air passage of the housing. The first bypass passage is defined between the evaporator and the air outlets of the housing. The first temperature blend door is pivotable about a central portion thereof so as to move from a closed position to an open position and be stopped at an infinite number of positions between the open and closed position. The handling system further includes a shoulder formed in the housing for sealingly engaging a first end of the first temperature blend door when the blend door is in a fully closed position. The shoulder also controls the amount of air flowing past the first end of the first temperature blend door when the blend door is pivoted toward the fully opened position.

The air handling system also includes a second temperature blend door disposed in a second bypass passage in the housing, the second bypass passage being defined between the heater core and the evaporator. The second blend door moves from a closed position to an open position and the first and second temperature blend door are operative to move in a coordinated motion according to a predetermined strategy dependent upon the temperature requested by a vehicle occupant. The handling system of the present invention also includes control means, such as an electric motor, for moving the first and second temperature blend doors to a predetermined position according to a predetermined strategy.

In the preferred embodiment of the present invention, the blend door system described above includes a third temperature blend door associated with and disposed adjacent to the second temperature blend door and which moves in tandem with the second temperature blend door from the first position to a second or fully closed position. The temperature blend door system is disposed in a center-mounted air handling system disposed generally about a longitudinal axis of the vehicle about its center line.

It is an advantage of the present invention to provide a neat and efficiently packaged air handling system for an air conditioning system of an automotive vehicle which allows for a smaller volume of mixing area between the air handling system and the outlet registers. These and other features, objects and advantages of the present invention will become apparent from the drawings, detailed description and claims which follow.

DETAILED DESCRIPTION OF THE PREFERRED EMBODIMENTS

Figure 1:
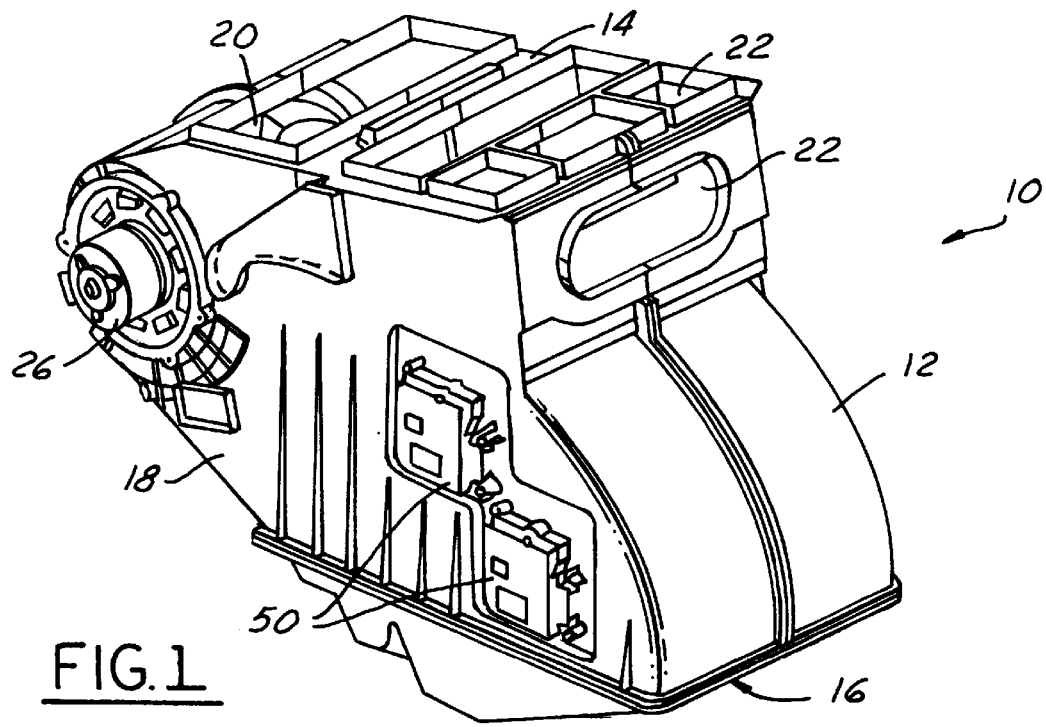
FIG. 1 is a perspective view of a center-mounted air handling system structured in accord with the principles of the present invention.

Referring now to the drawings, FIG. 1 shows a perspective view of a center-mounted air conditioning system for an automotive vehicle. The center-mounted air conditioning system 10 is designed so that it is packaged near the longitudinal centerline of the vehicle to accommodate either a right hand or a left hand drive vehicle. Such a system is shown in further detail in U.S. Pat. No. 5,673,964, assigned to the assignee of the present invention, the disclosure of which is hereby incorporated by reference. The center-mounted air conditioning system 10 includes an air handling housing 12 having a top side 14, a bottom side 16, and a pair of generally planar side walls 18. The housing includes an air inlet 20 for fresh or recirculation air as well as a plurality of air outlets 22 for directing air in to the passenger compartment of the vehicle (not shown) as is known in the art.

Figure 2:
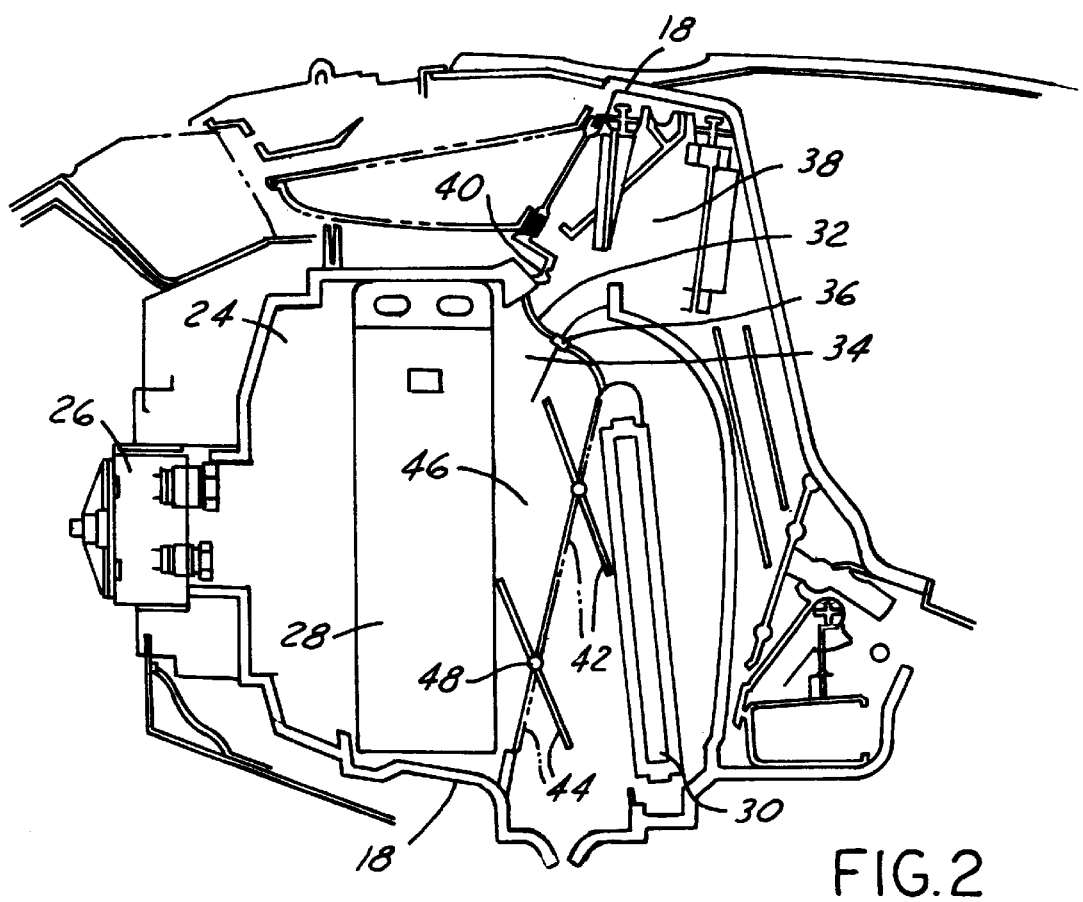
FIG. 2 is a cross-sectional view of FIG. 1 taken along line 2.2 of FIG. 1.
Figure 3:
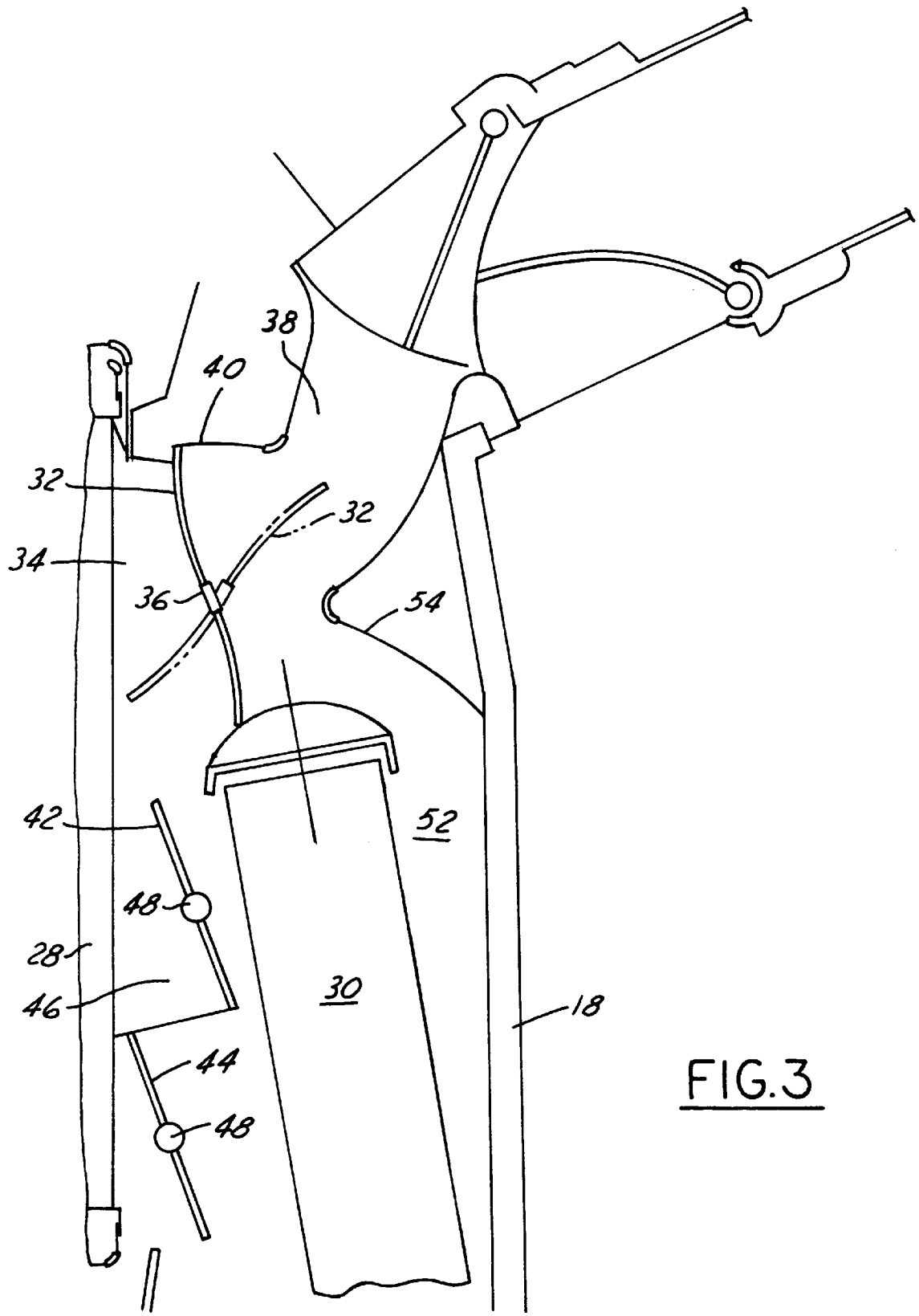
FIG. 3 is a cross-sectional, enlarged view of a portion of an air handling system structured in accord with the principles of the present invention.

As shown in more detail in FIGS. 2 and 3, the air conditioning system 10 of the present invention further includes a blower, such as a centrifugal blower 26 which draws air through the air inlet and directs air through an air passage 24 formed through the housing 12. The air conditioning system also includes an evaporator core 28 for cooling the air blown from the blower 26 through the evaporator core 28. The evaporator core 28 is disposed downstream from the blower 26 as shown in FIG. 2. The air conditioning system 10 further includes a heater core 30 adjacent to the evaporator core. The heater core 30 is disposed downstream from the evaporator core 28 and causes the air passing through it to become warm. The air passing through the heater core must first pass through the evaporator 28 however because of the center-mounted feature of the air conditioning system 10.

In order to provide air conditioned to an appropriate temperature as request by a vehicle occupant, a temperature blend door system is disposed within the air conditioning system 10. The temperature blend door system comprises a plurality of temperature blend doors as will be more fully described below which cause the cooled air from the evaporator to mix with the heated air from the heater core to provide conditioned air at a selected temperature.

As shown much more clearly in FIG. 3, the temperature blend door system includes a first temperature blend door 32 disposed in a first bypass passage 34 between the evaporator 28 and the heater core 30. The first blend door 32 is generally curvilinear in shape, almost an "S-shape" as shown in FIG. 3, although a generally straight door can be used as well. The first door 32 pivots about a central axis at its mid-point 36. As shown in FIG. 3, the first temperature blend door 32 is shown in solid lines as in the fully closed position such that all air passing through the evaporator 28 is directed through the heater core 30. The phantom-lined first temperature blend door 32 is in a position to allow full cooling such that all the air passing through the evaporator 28 is directed through the air outlets 22 to the vehicle compartment. The temperature blend door 32 is fabricated from a known polymeric material such as polypropylene or nylon as is well-known in the art.

The first temperature blend door has a first end 33 which sits against a shoulder 40 formed in the housing side wall 18 of the housing 12. The shoulder 40 is a very critical part of the invention. The shoulder 40 is configured to include a radius of curvature approximately equal to the radius of curvature of the blend door 32. This provides a feature that as the first temperature blend door 32 is being pivoted from a fully closed position as shown in solid lines to an open position shown by the phantom lines, no cooled air from the evaporator is allowed to pass over the first end 33 of the first blend door until the blend door has gone beyond a predetermined angle. The predetermined angle must be beyond 5° and is preferably less than 20°. This provides a very important benefit in that a typical center-mounted air conditioning system includes a very short or small mixing chamber 38 through which the conditioned air passes to the interior of the vehicle compartment. If cold air from the evaporator is allowed to enter this mixing passage 38 prior to receiving the warm air from the heater core will be described later, the air flowing through the air outlets into the interior vehicle component will not be at the temperature selected by the vehicle occupant because more cold air is being fed into the system prior to the warm air from the heater core mixing with it. Therefore, the shoulder 40 controls the amount of cold air from the evaporator entering the mixing chamber 38 as the first temperature blend door 32 is being opened.

The temperature control system of the present invention further includes a pair of second temperature blend doors 42, 44. These second temperature blend doors 42, 44 are disposed in a second bypass passage 46 between the evaporator 28 and the heater core 30. The function of these two blend doors is to regulate the amount of cooled air passing from the evaporator through the heater core 30. Each of these blend doors 42, 44 is pivoted about a central axis 48 to open or close the bypass passage 46 for air entering the heater core 30.

Figure 4:
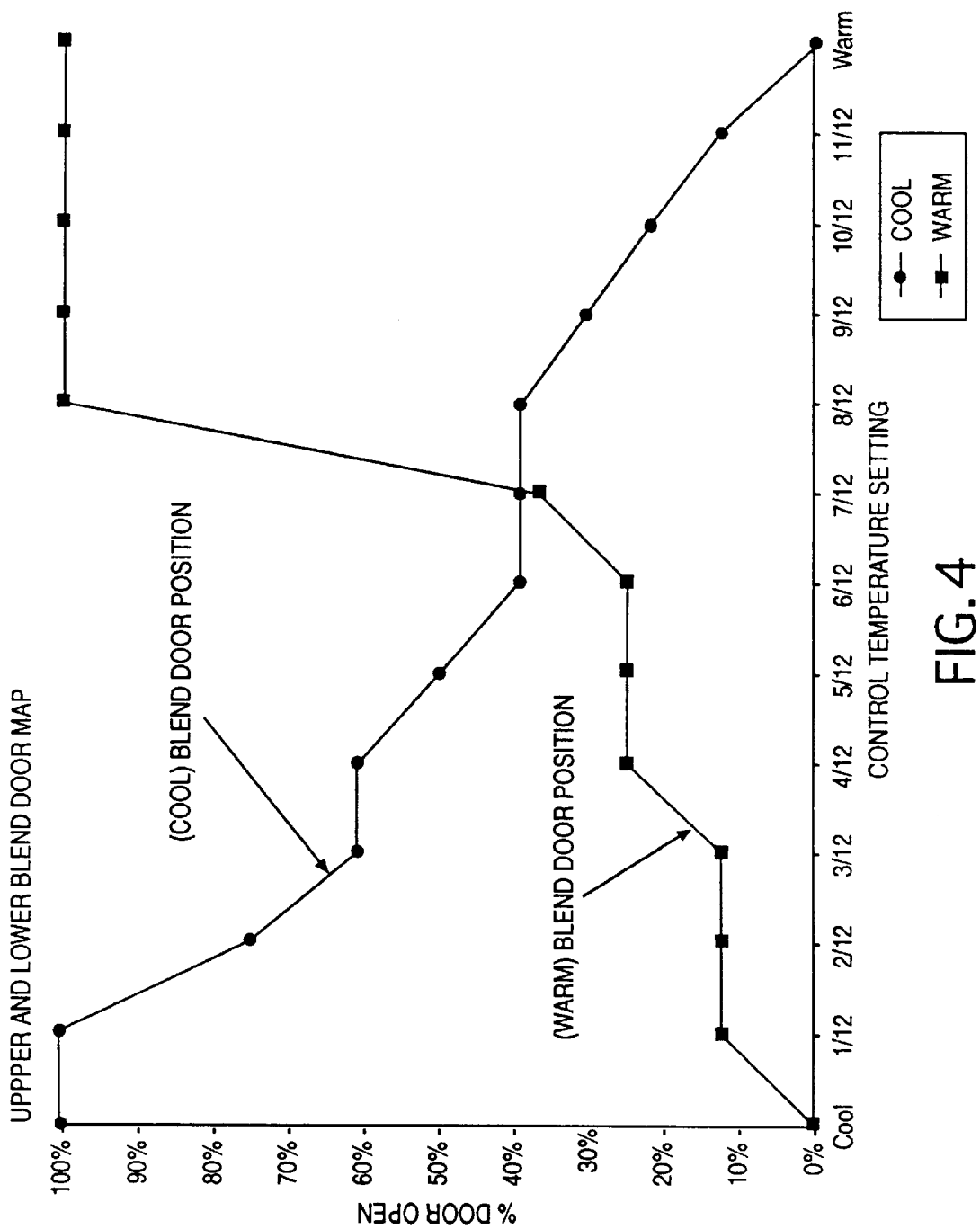
FIG. 4 is a diagrammatical curve of one control strategy to be used with the present invention.

Operation of the temperature blend door system of the present invention occurs in a coordinated manner. When a vehicle occupant selects a predetermined temperature for the interior of the passenger compartment as determined by a known means such as a temperature gage or digital selector, a processor directs the amount of rotation that each of the temperature blend doors, 32, 42 and 44 must move to generate the appropriate temperature air. The temperature doors 32, 42 and 44 are coordinated in their movement such that the temperature doors 42 and 44 move in tandem pursuant to a pre-selected temperature request. The temperature blend doors move according to a predetermined or predefined strategy. One example of a strategy is shown in FIG. 4. This strategy shows that for a requested temperature to be produced by the air conditioning system, the first temperature blend door 32 and the second and third blend doors 42 and 44 must be opened or closed a selected distance to predetermined positions. The processor simply looks up the values of the positions of the blend door for a given temperature in a lookup table and electric motors 50 (FIG. 1) move each of the temperature blend doors to appropriate positions to generate the requested temperature. Obviously, the strategy for determining the positions of each of the temperature blend doors varies per each center-mounted air conditioning system design and package requirements. Therefore, different vehicles will often have different control strategies and the present invention is not meant to be limited solely to the control strategies shown in FIG. 4.

In operation, the blower 26 forces inlet or recirculation air through the evaporator 28. The temperature blend doors 32, 42 and 44 determine the amount of air to be passed through the heater core 30. As the airs pass through the heater core 30 it enters a chamber 52. The housing 12 includes a throat section 54 which has a predetermined configuration. The configuration of the throat area of 54 along which the heated air follows after passing through the heater core is optimized to provide as much efficient air flow flowing therepast into mixing chamber 38 as possible. Therefore the configuration of the throat section 54 will also be optimized per vehicle package requirements. The air passing through the evaporator 28 passes the first temperature blend door 32 and enters into the mixing chamber 38 where the cold and warm air are combined to approximate the temperature requested by the vehicle occupant. Different mode doors are placed in positions to direct the air either to a defrost outlet, a registered vent, or to the floor as is commonly known in the art and shown in U.S. Pat. No. 5,673,964. By providing a blend door system such as described herein, better accuracy can be achieved in the output temperatures given the narrow and shortened packaging space for a center-mounted system.

Various other modifications and alterations of the present invention will no doubt occur to those skilled in the art. For example, the placement of the blend doors relative to each other and to the heater core and evaporator will be determined based upon packaging space and outlet locations for the air outlets. It is the following claims, including all equivalents, which define the scope of the present invention.

What is claimed is:

1. An air handling system for an air conditioning system for an automotive vehicle, comprising:

a housing having a top side, a bottom side and a pair of walls disposed therebetween which define an air passage, said housing further having an air inlet and a plurality of air outlets directed into a vehicle interior compartment;

a blower disposed in said housing and being operative to draw air into said housing and force said flow through said air passage;

an evaporator disposed in said housing for cooling said air as said air passes therethrough;

a heater disposed in said housing downstream from said evaporator and proximate thereto, said heater being operative to heat said air as said air passes therethrough;

a first temperature blend door disposed in a first bypass passage extending in said air passage and defined between said evaporator and said air outlets of said housing, said first temperature blend door being pivotable about a central portion thereof so as to move from a closed position to an open position;

a shoulder formed in said housing for sealingly engaging a first end of said first temperature blend door when said blend door is in a fully closed position and for controlling the amount of air flow therepast as said first temperature blend door is pivoted toward said fully opened position;

a second temperature blend door disposed in a second bypass passage extending in said air passage and defined between said heater and said evaporator, said second blend door being operative to move from a closed position to an open position, said first and second temperature blend doors being operative to move in a coordinated motion according to a predetermined strategy; and control means for moving said first and second temperature blend doors to a predetermined position according to a predetermined strategy.

2. An air handling system according to claim 1, wherein said first temperature blend door is generally curvilinear.

3. An air handling system according to claim 1, further including a third temperature blend door operatively associated with said second blend door and disposed adjacent thereto.

4. An air handling system according to claim 3, wherein said second and third temperature blend doors are operative to move in tandem from a first position to a second position.

5. An air handling system according to claim 3, wherein said second and third temperature blend doors pivotable about an axis generally perpendicular to the direction of air flowing through said housing, said axis being defined at a midpoint of the width of said doors.

6. An air handling system according to claim 1, wherein said shoulder of said housing has a predetermined configuration so as to control air flowing past said first end of said first temperature blend door until said first temperature blend door is pivoted a predetermined distance.

7. An air handling system according to claim 6, wherein said predetermined distance is between 5° and 20° toward a fully opened position.

8. An air handling system according to claim 6, wherein said shoulder of said housing includes a segment having a radius of curvature equal to the radius of curvature of said first temperature blend door.

9. An air handling system according to claim 1, wherein said control means comprises an electric motor.

10. An air handling system according to claim 1, wherein said system is disposed generally along a longitudinal centerline of said vehicle in said interior compartment.

11. A center-mounted air handling system for an automotive vehicle comprising:

a blower having a fresh air inlet, a recirculation inlet, and a blower air outlet fluidically connected to said blower for taking in fresh air and recirculation air and discharging said fresh air and said recirculation air out through said blower air outlet;

an evaporator core disposed within a housing and downstream of said blower outlet for receiving and cooling said outlet air from said blower;

a heater core disposed within said housing and downstream of said evaporator core for receiving and heating cooled air discharged by said evaporator core, and wherein said blower, said evaporator core and said heater core are disposed along a longitudinal axis of said vehicle at a central portion of said automotive vehicle;

a temperature blend door system disposed in said housing between said evaporator core and said heater core for controlling air flowing through said heater core, said blend door system comprising:

a first temperature blend door disposed in a first bypass passage, said first temperature blend door being generally curvilinear and being pivotable about a central portion thereof so as to move from a closed position to an open position;

a shoulder formed in said housing for sealingly engaging a first end of said first temperature blend door when said blend door is in a fully closed position and for controlling the amount of air flow therepast as said door is pivoted toward said fully opened position;

a second temperature blend door disposed in a second bypass passage extending between said heater core and said evaporator core, said second blend door being operative to move from a closed position to an open position;

a third temperature blend door operatively associated with said second blend door and disposed adjacent thereto such that said second and third temperature blend doors are operative to move in tandem from a first position to a second position, said first, second and third temperature blend doors being operative to move in a coordinated motion according to a predetermined strategy; and control means for moving said first, second and third temperature blend doors to a predetermined position according to a predetermined strategy.

12. A center mounted air handling system according to claim 11, wherein said first temperature blend door is generally S-shaped.

13. A center-mounted air handling system according to claim 11, wherein said second and third temperature blend doors pivotable about an axis generally perpendicular to the direction of air flowing through said housing, said axis being defined at a midpoint of the width of said doors.

14. A center-mounted air handling system according to claim 11, wherein said shoulder of said housing has a predetermined configuration so as to control air flowing past said first end of said first temperature blend door until said first temperature blend door is pivoted beyond predetermined distance.

15. A center-mounted air handling system according to claim 14, wherein said predetermined distance is between 5° and 20° toward a fully opened position.

16. A center-mounted air handling system according to claim 15, wherein said shoulder of said housing includes a segment having a radius of curvature equal to the radius of curvature of said first temperature blend door.

17. A center-mounted air handling system according to claim 11, wherein said control means comprises an electric motor.

18. A center-mounted air handling system for an automotive vehicle comprising:

a blower having a fresh air inlet, a recirculation inlet, and a blower air outlet fluidically connected to said blower for taking in fresh air and recirculation air and discharging said fresh air and said recirculation air out through said blower air outlet;

an evaporator core disposed within a housing and downstream of said blower outlet for receiving and cooling said outlet air from said blower;

a heater core disposed within said housing and downstream of said evaporator core for receiving and heating cooled air discharged by said evaporator core, and wherein said blower, said evaporator core and said heater core are disposed along a longitudinal axis of said vehicle at a central portion of said automotive vehicle;

a temperature blend door system disposed in said housing between said evaporator core and said heater core for controlling air flowing through said heater core, said blend door system comprising:

a generally S-shaped first temperature blend door disposed in a first bypass passage, said first temperature blend door being pivotable about a central portion thereof so as to move from a closed position to an open position;

a shoulder formed in said housing for sealingly engaging a first end of said first temperature blend door when said blend door is in a fully closed position and for controlling the amount of air flow therepast as said door is pivoted toward said fully opened position, said shoulder having a predetermined configuration so as to control air flowing past said first end of said first temperature blend door until said first temperature blend door is pivoted beyond 5° toward said fully opened position;

a second temperature blend door disposed in a second bypass passage extending between said heater core and said evaporator core, said second blend door being operative to move from a closed position to an open position;

a third temperature blend door operatively associated with said second blend door and disposed adjacent thereto such that said second and third temperature blend doors are pivotable about an axis generally perpendicular to the direction of air flowing through said housing, said axis being defined at a midpoint of the width of said doors and are operative to move in tandem from a first position to a second position, said first, second and third temperature blend doors being operative to move in a coordinated motion according to a predetermined strategy; and an electric motor connected to said first, second and third temperature blend doors for moving said first, second and third temperature blend doors to a predetermined position according to a predetermined strategy.

* * * * *